(12) United States Patent
Vu et al.

(10) Patent No.: US 12,283,820 B2
(45) Date of Patent: Apr. 22, 2025

(54) POWER SUPPLY SYSTEM FOR MOBILE VEHICLES

(71) Applicant: LITE-ON Technology Corporation, Taipei (TW)

(72) Inventors: Lam Vu, Taipei (TW); Yi-Chao Fan, Taipei (TW); Chih-Yu Kuo, Taipei (TW)

(73) Assignee: LITE-ON Technology Corporation, Taipei (TW)

( * ) Notice: Subject to any disclaimer, the term of this patent is extended or adjusted under 35 U.S.C. 154(b) by 63 days.

(21) Appl. No.: 18/482,041

(22) Filed: Oct. 6, 2023

(65) Prior Publication Data

US 2024/0128759 A1 Apr. 18, 2024

Related U.S. Application Data

(60) Provisional application No. 63/415,294, filed on Oct. 12, 2022.

(51) Int. Cl.
| | |
|---|---|
| *H02J 3/32* | (2006.01) |
| *B60L 53/51* | (2019.01) |
| *B60L 55/00* | (2019.01) |
| *H02J 3/46* | (2006.01) |
| *H02J 7/02* | (2016.01) |

(52) U.S. Cl.
CPC ............ *H02J 3/322* (2020.01); *B60L 53/51* (2019.02); *H02J 3/46* (2013.01); *H02J 7/02* (2013.01); *B60L 55/00* (2019.02); *H02J 2207/20* (2020.01); *H02J 2300/24* (2020.01)

(58) Field of Classification Search
CPC ...... H02J 3/322; H02J 3/46; H02J 7/02; H02J 2207/20; H02J 2300/24; B60L 53/51; B60L 55/00
USPC ............................................ 307/82, 52, 10.1
See application file for complete search history.

(56) References Cited

U.S. PATENT DOCUMENTS

| | | | |
|---|---|---|---|
| 8,138,624 B2* | 3/2012 | Yeh ........................... | B60L 1/00 307/26 |
| 2012/0129378 A1* | 5/2012 | Kiko ....................... | B60L 53/31 362/555 |
| 2016/0315541 A1* | 10/2016 | Chen ................. | H02M 3/33523 |
| 2024/0140224 A1* | 5/2024 | Lee ......................... | B60L 53/31 |
| 2024/0154542 A1* | 5/2024 | Choudhury ............... | H02J 7/02 |
| 2024/0227604 A1* | 7/2024 | Li .......................... | H02M 3/01 |
| 2024/0300354 A1* | 9/2024 | Wakida ............. | H02J 7/007192 |

* cited by examiner

*Primary Examiner* — Michael R. Fin

(57) ABSTRACT

A power conversion device includes a conversion device having includes a first, a second, a third and a fourth converter, and a control unit. The first converter has a first input terminal and a first output terminal; the second converter has a second input terminal and a second output terminal; the first and the second input terminal are electrically connected to a power supply. The third converter has a third input terminal and a third output terminal, the third input terminal is coupled to the first output terminal; the fourth converter has a fourth input terminal and a fourth output terminal; the fourth input terminal is coupled to the second output terminal, and the third output terminal is electrically connected to the fourth output terminal. The control unit is coupled to the conversion device, receives a power request from a load, and controls an output power of the conversion device.

11 Claims, 5 Drawing Sheets

POWER SUPPLY SYSTEM FOR MOBILE VEHICLES

CROSS-REFERENCE TO RELATED APPLICATION

This application claims the priority benefit of provisional Patent Application Ser. No. 63/415,294, filed on Oct. 12, 2022, the full disclosure of which is incorporated herein by reference.

BACKGROUND

Technical Field

The present invention relates to a power supply system, and in particular, to a power supply system for a mobile vehicle.

Related Art

Due to the increasing global energy shortage and environmental pollution problems, energy saving and carbon reduction has become the goal and direction of our joint efforts. Therefore, electric vehicles that can reduce carbon emissions have become the development focus of many manufacturers. In the process of developing electric vehicles, there have been some factors that have hindered the promotion of electric vehicles in the past. The most obvious thing is the battery charging time. Therefore, how to provide a power supply system that can shorten battery charging time has become one of the important issues.

SUMMARY

The present invention provides a power conversion device that can provide higher output power and shorten battery charging time.

The power conversion device of the present invention includes a conversion device and a control unit. The conversion device includes a first converter, a second converter, a third converter and a fourth converter. The first converter has a first input terminal and a first output terminal; the second converter has a second input terminal and a second output terminal; the first input terminal and the second input terminal are electrically connected to a power supply. The third converter has a third input terminal and a third output terminal; the third input terminal is coupled to the first output terminal, the fourth converter has a fourth input terminal and a fourth output terminal; the fourth input terminal is coupled to the second output terminal, and the third output terminal is electrically connected to the fourth output terminal. The control unit is coupled to the conversion device, receives a power request from a load, and controls an output power of the conversion device.

In one embodiment of the present invention, the power supply system further includes a measurement unit. The measurement unit is electrically connected to the third output terminal and the fourth output terminal, and measures a parameter value related to the output power. When the parameter value is greater than a first warning value, and the duration of the parameter value being greater than the first warning value is greater than a warning time, the control unit controls the conversion device to stop operating.

In one embodiment of the present invention, when the parameter value is greater than a second warning value and not greater than the first warning value, the control unit reduces the switching frequency or duty cycle of the third converter and the fourth converter.

In one embodiment of the present invention, the warning time is greater than or equal to 0.1 seconds and less than 5 seconds.

In one embodiment of the present invention, the first warning value is greater than or equal to 1.05 times the power request and less than or equal to 1.1 times the power request.

In one embodiment of the present invention, the conversion device further includes a connector, a power transmission cable, a first sensor and a second sensor. The power transmission cable is coupled to the connector and transmits the output power to the connector. The first sensor is disposed in the connector and senses and transmits the temperature of the connector to the control unit. The second sensor is disposed in the power transmission cable and senses and transmits the temperature of the power transmission cable to the control unit.

In one embodiment of the present invention, when the temperature of the connector is greater than or equal to 120 degrees Celsius or the temperature of the power transmission cable is greater than or equal to 55 degrees Celsius, the control unit controls the conversion device to stop operating.

In one embodiment of the present invention, the power supply system further includes a bus, a bidirectional converter and an energy storage device. The bus is electrically connected to the first output terminal, the second output terminal, the third input terminal and the fourth input terminal. The bidirectional converter is electrically connected to the bus. The energy storage device is electrically connected to the bidirectional converter.

In one embodiment of the present invention, the power supply system further includes a solar power generation module having a solar panel and a fifth converter. The solar panel electrically is connected to the fifth converter, and the fifth converter electrically connected to the bus.

In one embodiment of the present invention, the parameter value, the first warning value and the second warning value are a current value, a voltage value or a power value.

In one embodiment of the present invention, the load counts the sum of the output power received and transmits the sum to the control unit, and the control unit counts the sum of the output power output to the load and transmits the sum to the load.

In one embodiment of the present invention, the power supply is an AC power supply.

Based on the above, the power supply system of the present invention electrically connects the output terminal of the third converter and the output terminal of the fourth converter to provide higher output power and shorten the charging time of the battery.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
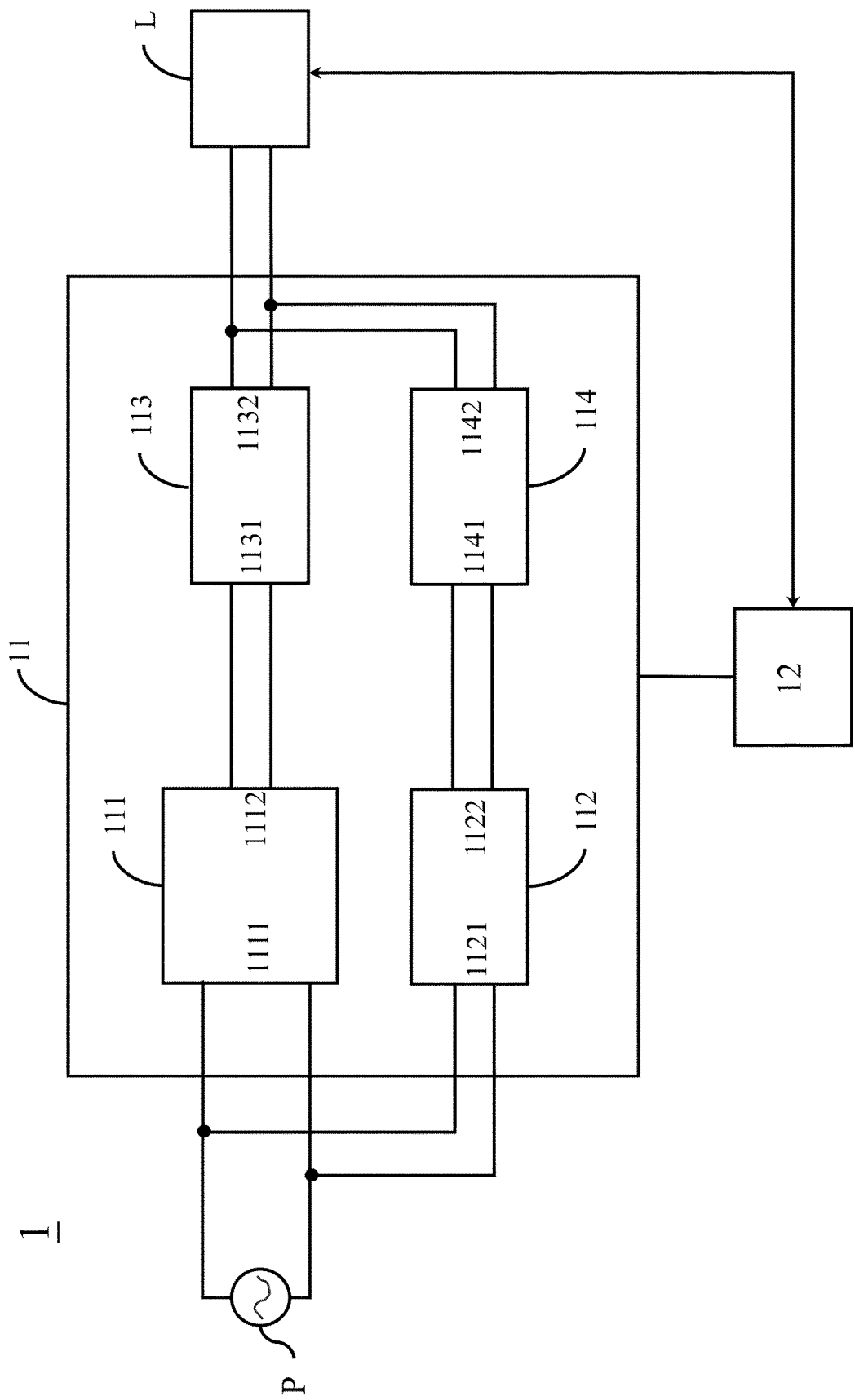
FIG. 1 is a schematic diagram of the power supply according to one embodiment of the present invention.

Refer to FIG. 1 illustrating a schematic diagram of the power supply according to one embodiment of the present invention. In this embodiment, the power supply system 1 is used for charging mobile vehicles. The mobile vehicles mentioned here refer to vehicles that use electricity as driving force, such as but not limited to cars, ships, airplanes, etc. The power supply system 1 includes a conversion device 11 and a control unit 12. The conversion device 11 includes a first converter 111, a second converter 112, a third converter 113 and a fourth converter 114. The first converter 111 has a first input terminal 1111 and a first output terminal 1112. The second converter 112 has a second input terminal 1121 and a second output terminal 1122. The first input terminal 1111 and the second input terminal 1121 are electrically connected to a power supply P. In this embodiment, the power supply P is an AC power supply, such as a single-phase AC power supply or a three-phase AC power supply, which is not limited thereto. The first converter 111 and the second converter 112 respectively include rectification and power factor correction circuits, convert the received AC power, and output DC power from the first output terminal 1112 and the second output terminal 1122.

The third converter 113 has a third input terminal 1131 and a third output terminal 1132. The third input terminal 1131 is coupled to the first output terminal 1112. The fourth converter 114 has a fourth input terminal 1141 and a fourth output terminal 1142. The fourth input terminal 1141 is coupled to the second output terminal 1122, and the third output terminal 1132 is electrically connected to the fourth output terminal 1142. In this embodiment, the third converter 113 and the fourth converter 114 are respectively DC/DC converters, such as resonant converters, forward converters, flyback converters or boost converters. The control unit 12 is coupled to the conversion device 11 and receives a power request from a load L. The control unit 12 controls the output power of the conversion device 11 according to the power request of the load L.

Specifically, the load L is the aforementioned mobile vehicle. When the load L is connected to the conversion device 11, communication is established between the control unit 12 and the load L, and the permission or authorization of the charging process is obtained. After receiving the power request from the load L, the control unit 12 evaluates the upper limit of the output power that the current conversion device 11 can provide, and provides the output power to the load L without exceeding the upper limit of the output power. It is noted that the so-called not exceeding the upper limit of the output power includes that the voltage value and current value output by the conversion device 11 to the load L must also meet the requirements of not exceeding the upper limit of the voltage value range and current value range that the power supply system 1 can output. In this embodiment, the third output terminal 1132 of the third converter 113 is electrically connected to the fourth output terminal 1142 of the fourth converter 114, so that the power supply system 1 can output a higher voltage/current. In other words, the power supply system 1 is able to provide higher output power and shorten the time for charging the load L. In addition, during the charging process in which the power supply system 1 provides output power to the load L for charging, the load L counts the sum of the received output power and transmits the result to the control unit 12. The control unit 12 counts the sum of the output power output to the load L and transmits the result to the load L. In this way, the power supply system 1 and the load L can not only collect and exchange relevant data for subsequent use in improving charging efficiency, but also serve as a standard for pricing and charging.

Figure 2:
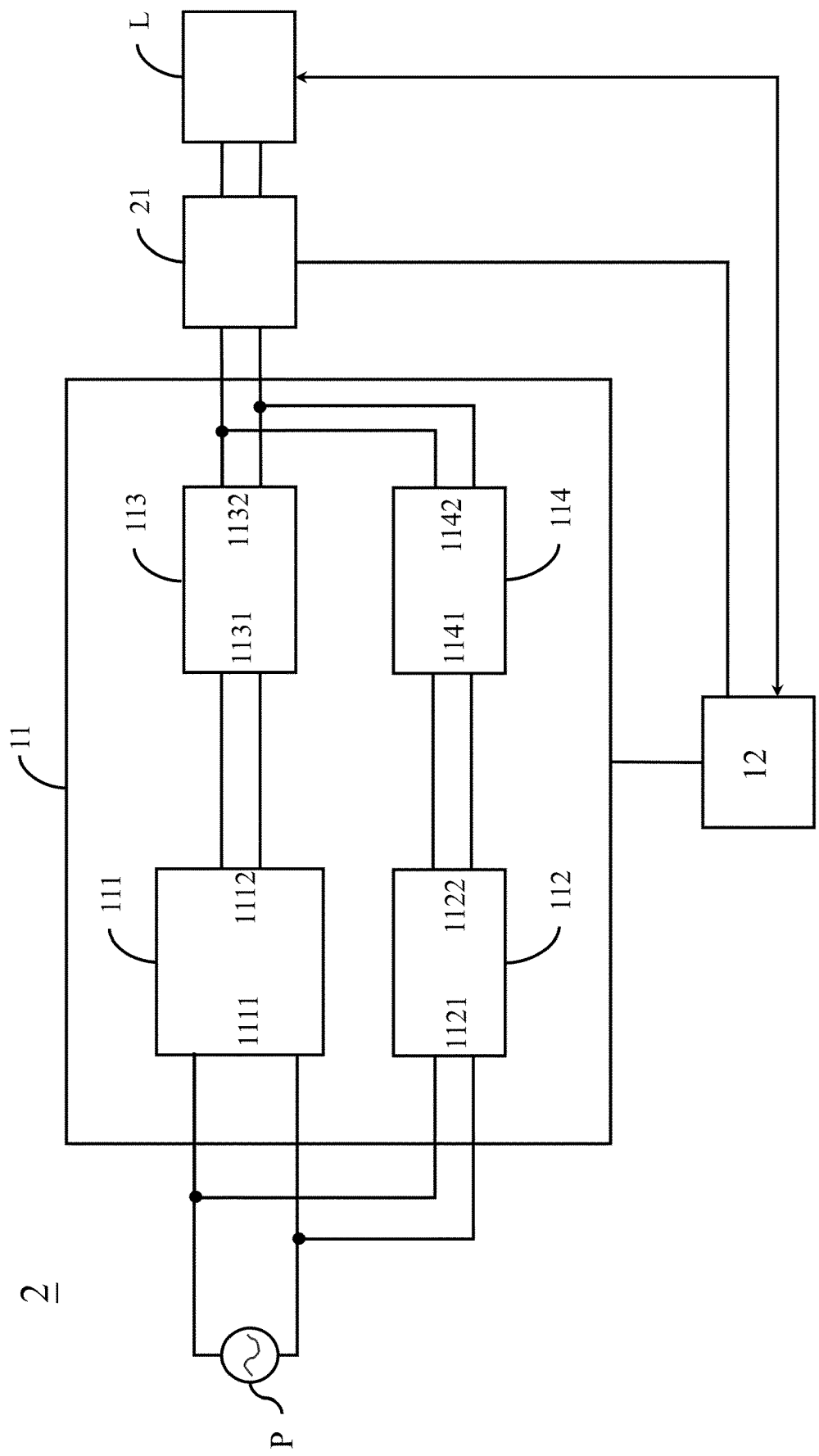
FIG. 2 is another schematic diagram of the power supply according to one embodiment of the present invention.

Refer to FIG. 2 illustrating another schematic diagram of the power supply according to one embodiment of the present invention. In this embodiment, the difference between the power supply system 2 and the power supply system 1 is that the power supply system 2 further includes a measurement unit 21. The measurement unit 21 is electrically connected to the third output terminal 1132 of the third converter 113 and the fourth output terminal 1142 of the fourth converter 114, and measures a parameter value related to the output power. Furthermore, in order to prevent the conversion device 11 of the power supply system 2 from providing an output power that the load L cannot afford and endangering the safety of the power supply system 2, the load L and the users, the measurement unit 21 measures the voltage value, the current value or the power value of the output power and use it as a parameter value. The control unit 12 compares the parameter value with a voltage value, current value or power value representing the power request of the load L. When the parameter value is greater than the first warning value, and the duration of the parameter value being greater than the first warning value exceeds the warning time, the control unit 12 controls the conversion device 11 to stop operating and stop providing output power.

In this embodiment, the parameter value and the first warning value are a current value, a voltage value or a power value. It should be noted that the parameter value and the first warning value are the same parameter, that is to say, the parameter value and the first warning value are the current values, voltage values or power values at the same time. In addition, the first warning value is set in a range of greater than or equal to 1.25 times the power requirement and less than or equal to 1.1 times the power requirement. Preferably, the first warning value is set to any value in the range of greater than or equal to 1.5 times the power requirement and less than or equal to 1.1 times the power requirement. The warning time is set to be greater than or equal to 0.1 seconds and less than 5 seconds. Preferably, the warning time is set to any value in the range of greater than or equal to 0.5 seconds and less than 5 seconds.

In order to achieve more flexible and effective security protection, a second warning value can be further set. When the parameter value is greater than the second warning value and not greater than the first warning value, the control unit 12 reduces the switching frequency or duty cycle of the third converter 113 and the fourth converter 114, thereby reducing the output power. In this embodiment, the second warning value is smaller than the first warning value, and the first warning value and the second warning value are the same parameters. That is to say, the first warning value and the second warning value are simultaneously the current values or voltage values or power values.

Figure 3:
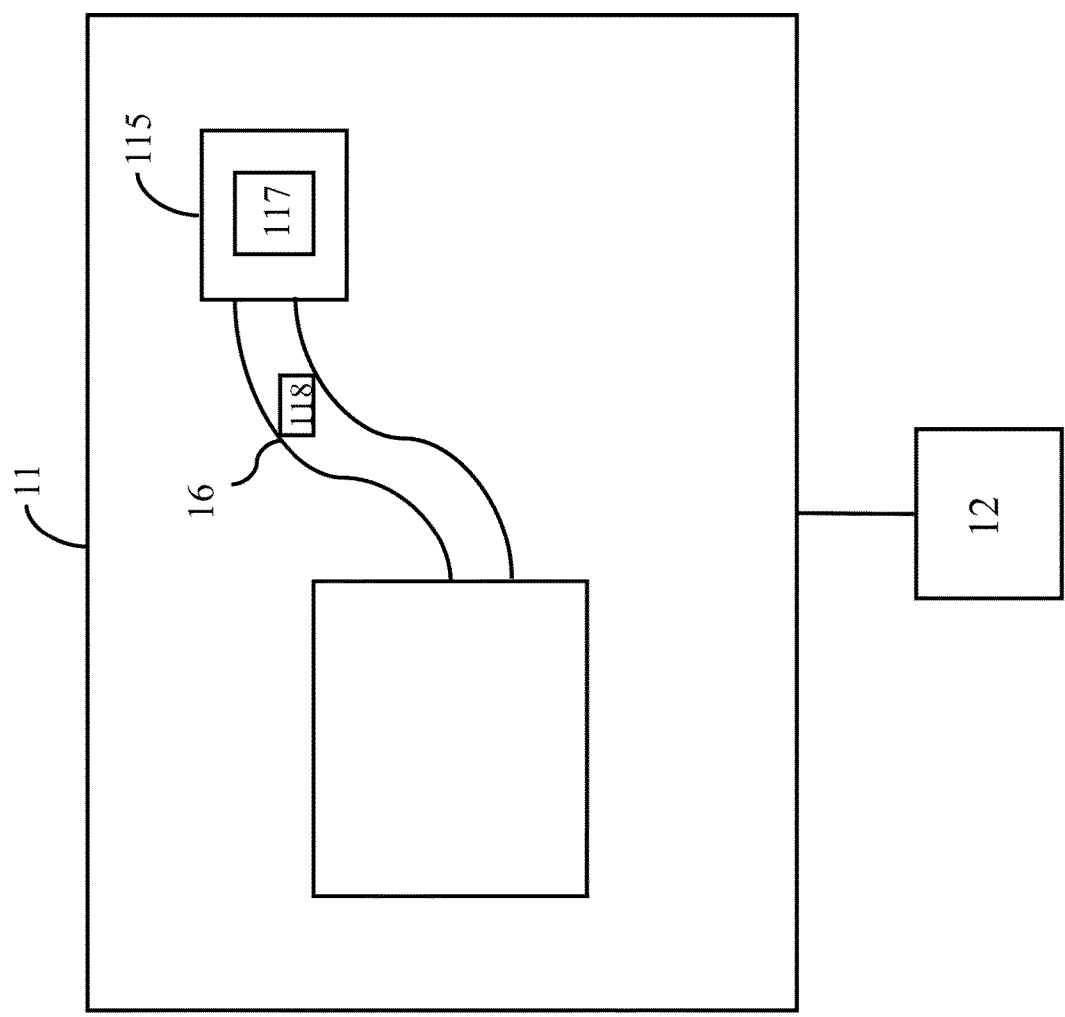
FIG. 3 is a schematic diagram of the conversion device according to one embodiment of the present invention.

Refer to FIG. 1 and FIG. 3 illustrating a schematic diagram of the conversion device according to one embodiment of the present invention. The conversion device 11 further includes a connector 115, a power transmission cable 116, a first sensor 117 and a second sensor 118. It should be noted that only the connector 115, the power transmission cable 116, the first sensor 117 and the second sensor 118 are shown in FIG. 3. In this embodiment, the power transmission cable 116 is coupled to the connector 115 and transmits the output power to the connector 115. The first sensor 117 is disposed in the connector 115 and senses and transmits the temperature of the connector 115 to the control unit 12. The second sensor 118 is disposed in the power transmission cable 116 and senses and transmits the temperature of the power transmission cable 116 to the control unit 12. When the temperature of the connector 115 is greater than or equal to 120 degrees Celsius or the temperature of the power transmission cable 116 is greater than or equal to 55 degrees Celsius, the control unit 12 controls the conversion device 11 to stop operating and stop providing output power. Based on the foregoing architecture, the power supply system 1 of this embodiment can also avoid hazards caused by excessive temperature during the charging process.

Figure 4:
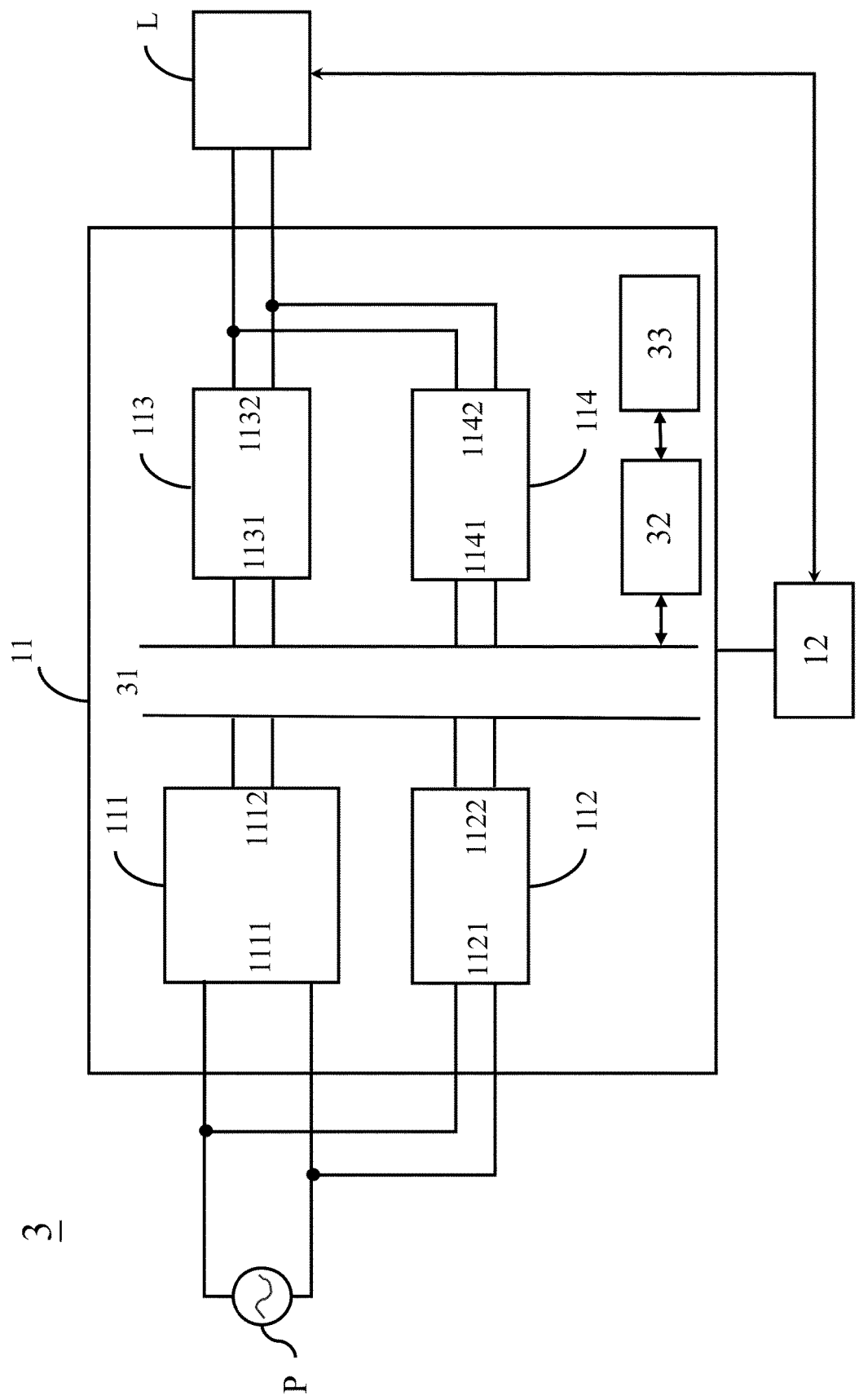
FIG. 4 is another schematic diagram of the power supply according to one embodiment of the present invention.

Refer to FIG. 4 illustrating another schematic diagram of the power supply according to one embodiment of the present invention. In this embodiment, the difference between the power supply system 3 and the power supply system 1 is that the power supply system 3 further includes a bus 31, a bidirectional converter 32 and an energy storage device 33. The bus 31 is a DC bus and is electrically connected to the first output terminal 1112 of the first converter 111, the second output terminal 1122 of the second converter 112, the third input terminal 1131 of the third converter 113 and the fourth input terminal 1141 of the fourth converter 114. The bidirectional converter 32 is electrically connected to the bus 31. The energy storage device 33 is electrically connected to the bidirectional converter 32. Furthermore, the bidirectional converter 32 can receive and convert the power from the bus 31 and store the converted power in the energy storage device 33. In addition, the energy storage device 33 is able to release the stored power to the bus 31 via the bidirectional converter 32 according to demand.

Figure 5:
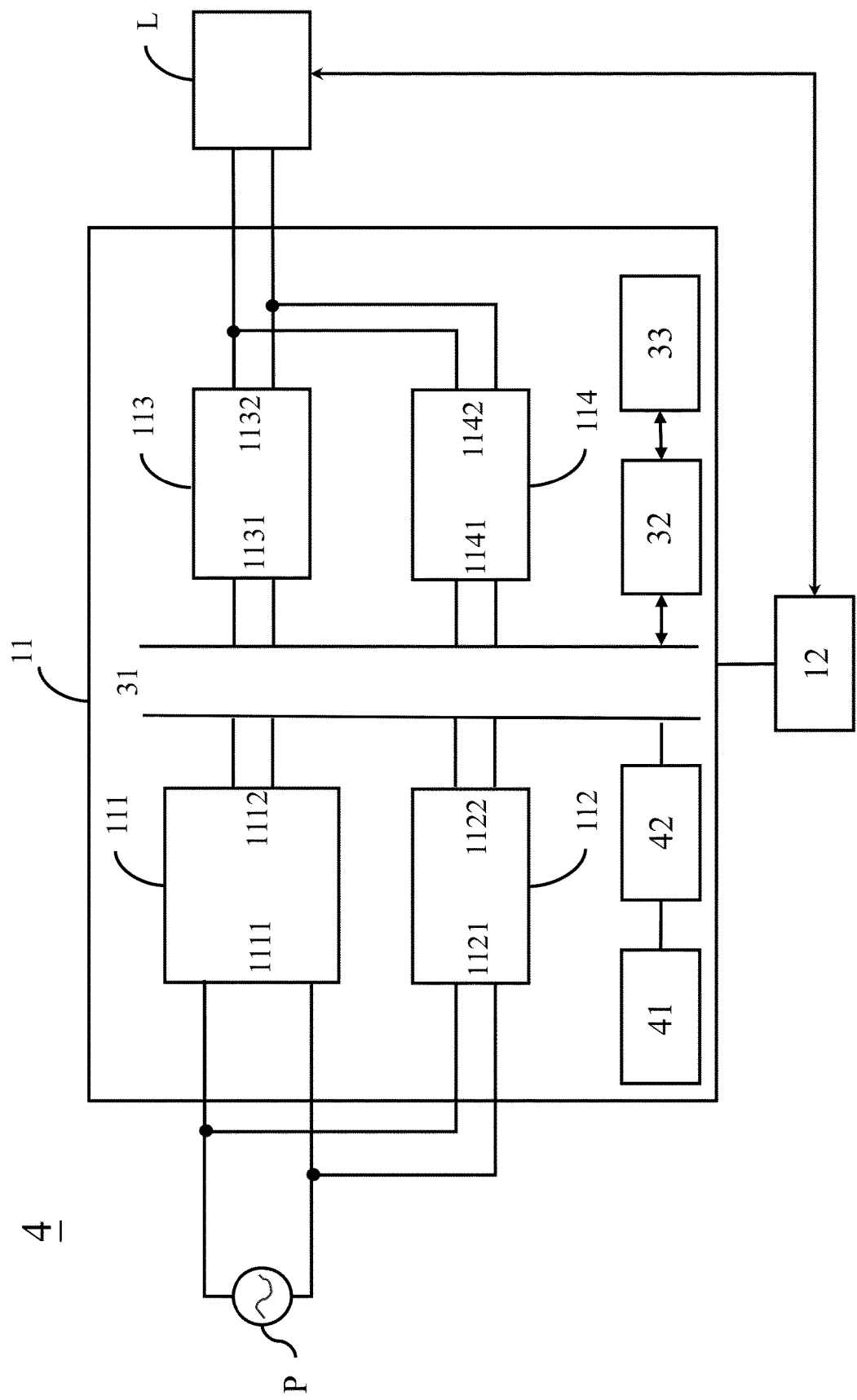
FIG. 5 is another schematic diagram of the power supply according to one embodiment of the present invention.

Refer to FIG. 5 illustrating another schematic diagram of the power supply according to one embodiment of the present invention. In this embodiment, the difference between the power supply system 4 and the power supply system 3 is that the power supply system 4 further includes a solar power generation module 41. The solar power generation module 41 includes a solar panel 411 and a fifth converter 412. The solar panel 411 is electrically connected to the fifth converter 412, and the fifth converter 412 is electrically connected to the bus 31. By using the bidirectional converter 32, the energy storage device 33 and the solar power generation module 41, the power supply system 4 can provide more stable power.

Based on the above, the power supply system of the present invention electrically connects the output terminal of the third converter and the output terminal of the fourth converter to provide higher output power and shorten the charging time of the battery.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A power supply system for mobile vehicles, comprising:
   a conversion device comprising a first converter, a second converter, a third converter and a fourth converter, the first converter having a first input terminal and a first output terminal, the second converter having a second input terminal and a second output terminal, the first input terminal and the second input terminal electrically connected to a power supply, the third converter having a third input terminal and a third output terminal, the third input terminal coupled to the first output terminal, the fourth converter having a fourth input terminal and a fourth output terminal, the fourth input terminal coupled to the second output terminal, the third output terminal electrically connected to the fourth output terminal; and a control unit coupled to the conversion device, receiving a power request from a load, and controlling an output power of the conversion device;

wherein the load counts the sum of the output power received and transmits the sum to the control unit, and the control unit counts the sum of the output power output to the load and transmits the sum to the load.

2. The power supply system according to claim 1, further comprises:

a measurement unit electrically connected to the third output terminal and the fourth output terminal, and measuring a parameter value related to the output power;

wherein when the parameter value is greater than a first warning value, and the duration of the parameter value being greater than the first warning value is greater than a warning time, the control unit controls the conversion device to stop operating.

3. The power supply system according to claim 2, wherein when the parameter value is greater than a second warning value and not greater than the first warning value, the control unit reduces the switching frequency or duty cycle of the third converter and the fourth converter.

4. The power supply system according to claim 2, wherein the warning time is greater than or equal to 0.1 seconds and less than 5 seconds.

5. The power supply system according to claim 2, wherein the first warning value is greater than or equal to 1.05 times the power request and less than or equal to 1.1 times the power request.

6. The power supply system according to claim 1, wherein the conversion device further comprises:

a connector;

a power transmission cable coupled to the connector and transmitting the output power to the connector;

a first sensor disposed in the connector and senses and transmitting the temperature of the connector to the control unit; and a second sensor disposed in the power transmission cable and sensing and transmitting the temperature of the power transmission cable to the control unit.

7. The power supply system according to claim 6, wherein when the temperature of the connector is greater than or equal to 120 degrees Celsius or the temperature of the power transmission cable is greater than or equal to 55 degrees Celsius, the control unit controls the conversion device to stop operating.

8. The power supply system according to claim 1, further comprises:

a bus electrically connected to the first output terminal, the second output terminal, the third input terminal and the fourth input terminal;

a bidirectional converter electrically connected to the bus; and an energy storage device electrically connected to the bidirectional converter.

9. The power supply system according to claim 8, further comprises:

a solar power generation module having a solar panel and a fifth converter, the solar panel electrically connected to the fifth converter, and the fifth converter electrically connected to the bus.

10. The power supply system of claim 2, wherein the parameter value, the first warning value and the second warning value are a current value, a voltage value or a power value.

11. The power supply system of claim 1, wherein the power supply is an AC power supply.

* * * * *